(12) United States Patent
Tahtouh

(10) Patent No.: US 9,630,091 B2
(45) Date of Patent: Apr. 25, 2017

(54) IMAGE PROCESSING

(71) Applicant: The Finch Company Pty Limited, Paddington (AU)

(72) Inventor: Emad Tahtouh, Paddington (AU)

(73) Assignee: The Finch Company Pty Limited, Paddington, NSW (AU)

( * ) Notice: Subject to any disclaimer, the term of this patent is extended or adjusted under 35 U.S.C. 154(b) by 157 days.

(21) Appl. No.: 14/346,634

(22) PCT Filed: Sep. 21, 2012

(86) PCT No.: PCT/AU2012/001149
§ 371 (c)(1),
(2) Date: Mar. 21, 2014

(87) PCT Pub. No.: WO2013/040656
PCT Pub. Date: Mar. 28, 2013

(65) Prior Publication Data
US 2014/0213364 A1  Jul. 31, 2014

Related U.S. Application Data

(60) Provisional application No. 61/624,172, filed on Apr. 13, 2012.

(30) Foreign Application Priority Data

Sep. 23, 2011 (AU) ................ 2011101230
Apr. 13, 2012 (AU) ................ 2012901469

(51) Int. Cl.
*H04N 13/04* (2006.01)
*A63F 13/00* (2014.01)
(Continued)

(52) U.S. Cl.
CPC ............ *A63F 13/00* (2013.01); *G02B 5/30* (2013.01); *G02B 27/0101* (2013.01);
(Continued)

(58) Field of Classification Search
CPC .......... H04N 13/0434; H04N 13/0438; H04N 13/0445
See application file for complete search history.

(56) References Cited

U.S. PATENT DOCUMENTS 3,846,018 A * 11/1974 Gerson ................ G02C 5/2263
16/228
5,162,897 A   11/1992 Jitsukata et al.
(Continued)

FOREIGN PATENT DOCUMENTS

JP          2005311833 A    11/2005

OTHER PUBLICATIONS

International Search Report and International Preliminary Report on Patentability of PCT/AU2012/001149 mailed on Jan. 16, 2014, 12 pages.

*Primary Examiner* — James S McClellan
*Assistant Examiner* — Kevin Carter
(74) *Attorney, Agent, or Firm* — Kilpatrick Townsend & Stockton

(57) ABSTRACT

A system, having an image production module adapted to generate two images with different content and a display module adapted to synchronously display the images such that each image can be selectively viewed depending on a viewer selecting an appropriate visual aide.

10 Claims, 4 Drawing Sheets

(51) Int. Cl.
*G03B 35/00* (2006.01)
*G02B 5/30* (2006.01)
*G02B 27/01* (2006.01)

(52) U.S. Cl.
CPC ......... *G02B 27/0172* (2013.01); *G03B 35/00* (2013.01); *H04N 13/0434* (2013.01); *H04N 13/0438* (2013.01); *G02B 2027/0134* (2013.01); *G02B 2027/0178* (2013.01)

(56) References Cited

U.S. PATENT DOCUMENTS

| | | | | |
|---|---|---|---|---|
| 5,701,154 A * | 12/1997 | Dasso | ................ | H04N 13/0018 348/42 |
| 5,963,371 A | 10/1999 | Needham et al. | | |
| 7,572,006 B2 | 8/2009 | Begon et al. | | |
| 7,656,581 B2 | 2/2010 | Giraudet | | |
| 8,172,393 B2 * | 5/2012 | Tendler | ................ | G02C 7/12 351/45 |
| 8,947,512 B1 * | 2/2015 | Johnston | ............ | H04N 13/0033 348/56 |
| 2004/0056948 A1 * | 3/2004 | Gibson | .............. | H04N 13/0438 348/56 |
| 2007/0146574 A1 * | 6/2007 | Giraudet | ................ | A42B 3/226 349/86 |
| 2007/0216868 A1 | 9/2007 | Cashin et al. | | |
| 2008/0158095 A1 * | 7/2008 | Neidrich | ................ | A63F 13/02 345/6 |
| 2008/0310018 A1 * | 12/2008 | Tripp | ..................... | A63F 13/00 359/483.01 |
| 2010/0007582 A1 * | 1/2010 | Zalewski | ................ | A63F 13/00 345/8 |
| 2010/0201954 A1 | 8/2010 | West | | |
| 2011/0254934 A1 * | 10/2011 | Yoon | ........................ | H04N 5/45 348/56 |
| 2012/0313930 A1 * | 12/2012 | Yun | .................... | G02B 27/2264 345/419 |

* cited by examiner

IMAGE PROCESSING

FIELD OF THE INVENTION

The present invention relates to image processing and viewing devices.

BACKGROUND OF THE INVENTION 3D image processing involves taking video feed from two adjacent cameras and displaying the associated video signals synchronously on a screen. One video signal may be polarized and the other signal oppositely polarized. Alternatively, the different signals may be presented as rapidly alternating images so as to appear synchronous to the viewer.

Throughout the specification, use of the word "synchronous" or "simultaneous" is intended to mean display of an image either simultaneously, in rapid succession so as to have no visually discernable time difference between the images displayed or display of an images so that there is at least no causal mismatch between the images.

Also, use of the word "image" is intended to include any form of image generated either as a still image or a moving image in a video stream.

In order for a viewer to be able to process the 3D image, a visual aid is needed. The visual aid may be a set of glasses with right and left polarized lenses, if the video signals have been polarized. Alternatively, the visual aid may be a set of "active" glasses, to enable rapidly alternating images to be viewed in 3D. Active glasses shutter one eye at a time in synch with the images being alternated so that each eye receives a separate video image, which results in the viewer effectively seeing a 3D image.

OBJECT OF THE INVENTION

The present invention seeks to take advantage of the principles of 3D processing, to provide increased content for a viewer.

SUMMARY OF THE INVENTION

In accordance with the invention, there is provided a system having an image production module adapted to generate two images with different content, a display module adapted to synchronously display the images and a visual aid to be worn by a viewer and allowing the viewer to view one of the images and block the other image and to switch between the images, as required, using the same visual aid, the visual aid including a pair of polarized lenses, each lens being divided into two sections of perpendicular polarity so that an image of one polarity can be viewed simultaneously through the glasses in one orientation and an image of another orientation can be viewed through the other sections in each lens, in another orientation, wherein the sections are divided horizontally so that a viewer can view different images by tilting the glasses up and down to look through with the top set of lenses or the bottom set of lenses.

In another aspect, there is provided a visual aide including a pair of polarized lenses, each lens being divided into two sections of perpendicular polarity so that an image of one polarity can be viewed simultaneously through the glasses in one orientation and an image of another orientation can be viewed through the other sections in each lens, in another orientation wherein the sections are divided horizontally so that a viewer can view different images by tilting the glasses up and down to look through with the top set of lenses or the bottom set of lenses.

In another aspect, there is provided a viewing device including dual filters allowing selective viewing of both a first image of a first polarity and a second image of a perpendicular second polarity, respectively, wherein the filters are horizontally separated so that a viewer can switch between images by looking through either the top filters or the bottom filters.

Preferably, the dual filters are associated with each eye of a viewer.

Preferably, the dual filters are each provided in the form of a lens in a glasses frame.

Preferably, the filters are horizontally separated so that a viewer can switch between images by looking through either the top filters or the bottom filters.

In another aspect, there is provided a method including: processing first and second images of different scenes to have first and second polarity, respectively, for simultaneous display; displaying the images simultaneously; and viewing the images through a viewing device with dual filters, wherein the filters are horizontally separated so that a viewer can switch between images by looking through either the top filters or the bottom filters and wherein each of the dual filters allow transmission of one or the other of the displayed first and second images and wherein the viewer selects which of the filters to look through in order to switch between the images.

Preferably, the images are processed to sync with a common audio stream.

In another aspect, there is provided a game play system, including: a processor for producing a first video image of a first polarity and a second video image of a second polarity; a display for presenting the first and second images simultaneously; and a viewing device to allow a player to view one of the images and block the other image and to switch between the images, as required, using the same viewing device to switch between the video images, the viewing device including dual filters allowing selective viewing of both a first image of a first polarity and a second image of a perpendicular second polarity, respectively, wherein the filters are horizontally separated so that a viewer can switch between images by looking through either the top filters or the bottom filters.

BRIEF DESCRIPTION OF THE DRAWINGS

The invention is described, by way of non-limiting example only, with reference to the accompanying drawings, in which.

DETAILED DESCRIPTION OF THE DRAWINGS

Figure 1:
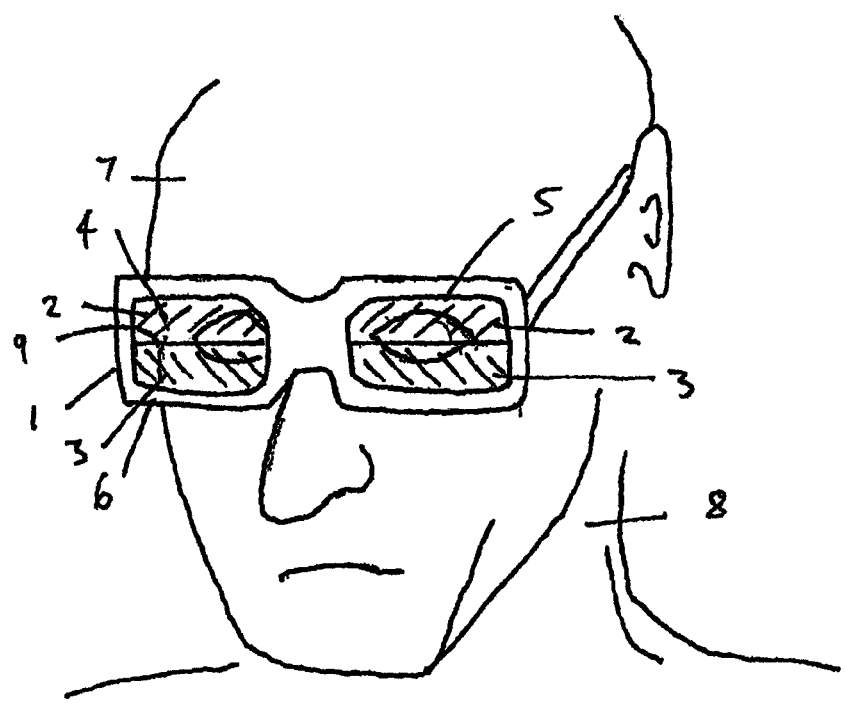
FIG. 1 is a schematic diagram illustrating a viewing aid.

A viewing aid 1 is shown in FIG. 1 as including dual filters 2, 3 forming lenses 4, 5 of glasses 6, which a positioned on a head 7 of a viewer 8.

The filters 2, 3 are separated along a horizontal line 9, although other possible arrangements may be used. The arrangement of the filters 2, 3 in one lens 4 is identical to the arrangement of filters 2, 3 in the other lens 5 so that one type of filter 2, for example a left polarised filter, is at the top of each lens 4, 5 and the other type of filter 3, a right polarised filter, is at the bottom.

The top filters 2 are arranged to transmit an image of a first polarity while the bottom filters 3 transmit a second image of a different polarity, to the exclusion of the first image.

As such, by looking through the top filters 2, the viewer 8 can see a first image and by looking through the other filters 3, the viewer can switch to a second image, which may be of a completely different scene. The viewer 8 can tilt the glasses 6 or head 7 to assist with switching between images.

Figure 2:
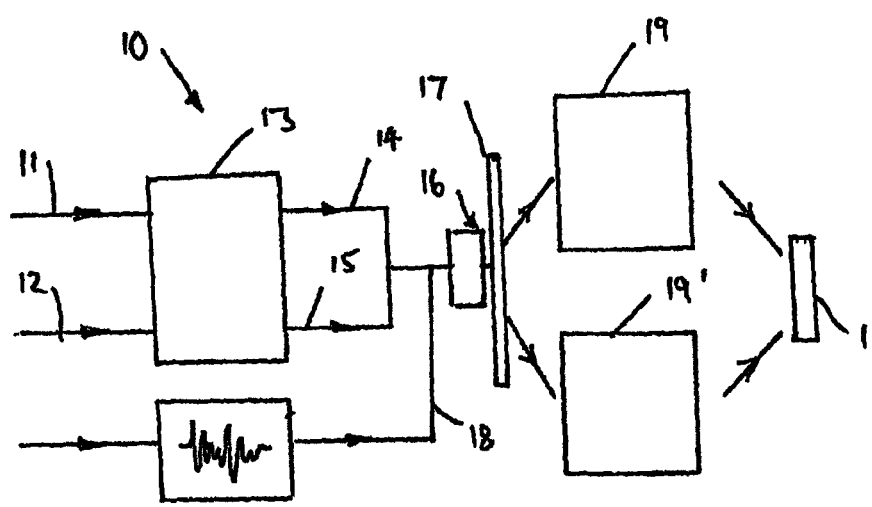
FIG. 2 is a schematic diagram illustrating an image processing method.

A method 10 for creating the images is illustrated in FIG. 2. The method 10 includes receiving video streams 11, 12, processing the video streams in a processor 13 to generate a first signal 14 which represents a first 2D image for display in a first polarity and a second signal 15 which represents a second 2D image for display in a second polarity. The first and second images are preferably of entirely different scenes, as opposed to the same scene shot from a slightly different angle, as produced for normal 3D viewing.

At stage 16 the images 19, 19' are displayed simultaneously on a screen 17 for viewing though the viewing aid 1. By "simultaneously" is meant the visual impression is simultaneous. The image signals 14, 15 can, of course, be displayed either at the same time or rapidly alternating so as to be simultaneous to the eye, depending on the polarisation and display technique used. If the images are displayed in rapid succession on an "active screen", instead of being side by side or top and bottom on a passive screen, a different viewing aid in the form of a pair of active glasses would be required.

Both images are processed to sync with a single audio stream 18 as well so the separate images match a common audio theme, albeit from different visual or conceptual perspectives.

In either case, it will be appreciated a viewer 8 looking through the device 1 will have full screen viewing with accompanying audio for either 2D image, depending on which one of the filters 2, 3 the screen in viewed through.

Accordingly, rather than use the polarisation technique to display a single 3D image on the screen, the invention uses the same technology to display two separate 2D images. Two completely separate 2D video streams 11, 12 are polarised, similar to the way 3D video is polarised, although the video must go through a different grading and concurrent overlapping motion matching process in order to remove "bleed" or "ghosting" of images.

Figure 3:
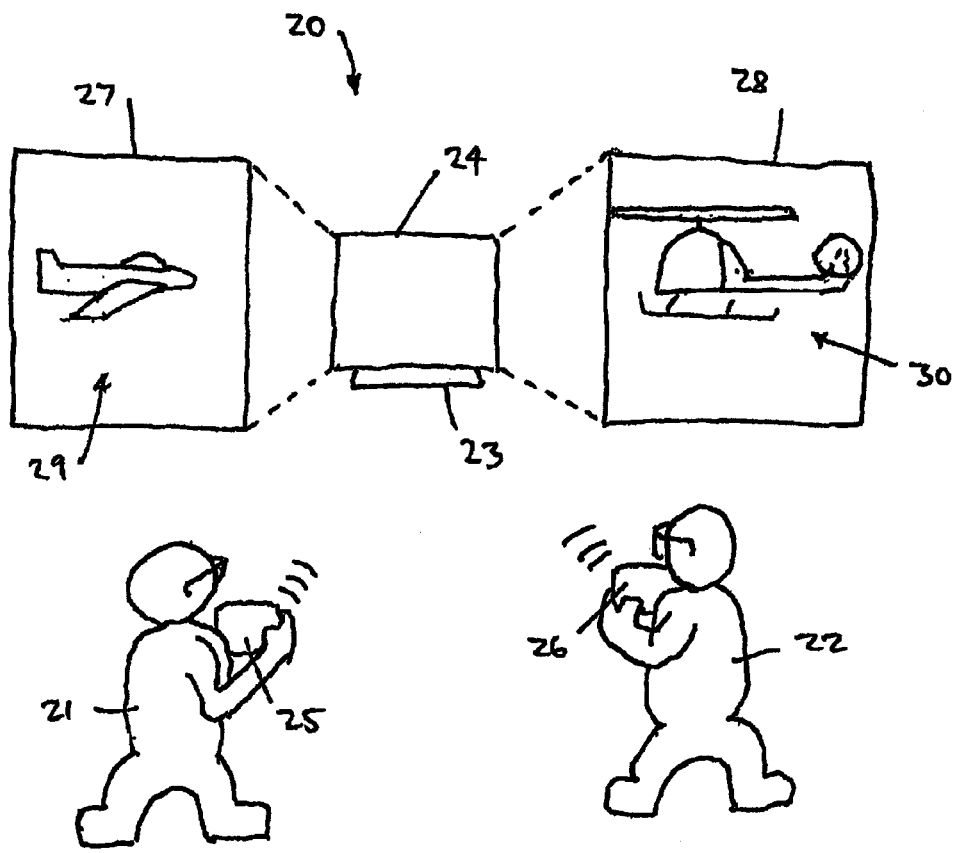
FIG. 3 is a schematic illustration representing a game play.

An application of the invention is illustrated in FIG. 3, where two players 21, 22 are involved in game play on a game play system 20, which includes a processor 23, a display 24 and gaming consoles 25, 26.

Each player 21, 22 is wearing a set of glasses 6 and viewing the same display 24. The player 21 on the left is looking through the top filters 2 in the glasses 6 so that the image seen is a first image 24. The second player 22 is looking through the bottom filters 3 to see a second image 28, on the same display 24.

Each of the players 21, 22 can interact with scenes 29, 30 shown in their own particular image 27, 28, such as via the gaming consoles 25, 26.

If the second player 22 wishes to quickly check the game of the first player 21, they can quickly look through the other filters 2 to reveal the image 27 for the first player 21. This could have particular advantage if the game is a team combat game where the players 21, 22 have different tasks and video feed but a common objective such that they may benefit from knowing the position or situation of the other player.

In that arrangement, it is also possible the players could be provided with individual audio feed to match the separate images 27, 28, instead of sharing a common audio feed.

Other applications of the technology could be more in the field of marketing or cinematography. For example, consumers could be given glasses which contain either two left polarised lenses or two right polarised lenses such that half the audience could be watching Film A while the other half was watching Film B. With a cleverly crafted piece of film, this could be used to present a thought provoking film on topics such as racism, sexism, politics or violence.

Another aspect of the invention is now described with reference to FIGS. 4 and 5. This aspect also utilises the same principles used in 3D film making in so far as images are produced for simultaneous display. However, as may be apparent from the above, the present invention uses images that differ in content so that a viewer can see a different image, depending on the visual aid selection. An "image" in this context refers to a moving image generated from a video stream, although the term is equally applicable to still images as well. In the example described below, the differing content is in the form of subtitle text.

Figure 4A:
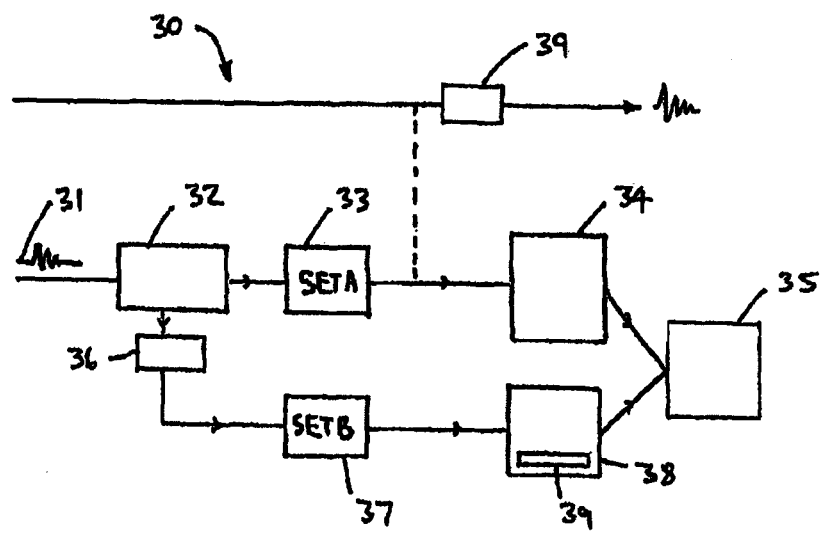
FIGS. 4a and 4b are schematic diagrams illustrating an image processing system.

Referring firstly to FIG. 4a, a simplified schematic diagram of a processing system 30 is shown. A video stream signal 31 is input to a processor 32 which formats the signal into a data file 33 that includes data set A, for producing a first image 34, which is presented on display 35.

A module 36 is provided to allow the video signal 31 to be processed with a rendered subtitle overlay. The module 36 may be a separate processing component or an integrated functional component of the processor 32, which allows additional data to be added to or coded into the video signal in order to generate a second data file 37, which comprises data set B. The second data file 37 has sufficient information to produce a second image 38 with subtitle text, indicated by reference number 39, for display on the screen 35.

The images 34, 38 are synchronously displayed and preferably provide the video component of a movie, so that two separate images are presented to a viewer. An audio file 39, which may be derived from an encoded set of data in the original data file 33 or generated separately, provides the audio stream 40 to accompany the images 34, 38. The audio stream is preferably common to match both images.

The images 34, 38 may be oppositely polarized to allow selective viewing of one or other of the images, dependent on the viewing aid used. If, for example, a visual aid in the form of a pair of glasses with two right polarized lenses is selected, only the right polarized image would be viewed and the other image would be blocked. Alternatively, the images may be displayed in rapid succession and the viewer selects an appropriate set of active glasses to view one or the other image.

In the example shown, a viewer can see, for example, a film without subtitles by viewing the first image 34 or can see a film with subtitles by viewing the second image 38, with subtitles 39.

This has an advantage in so far as some viewers may find it annoying to watch a film with subtitles, yet the system 30 allows other viewers to still enjoy the film with subtitles, if the language of the audio stream is not in their preferred or natural language.

Figure 4B:
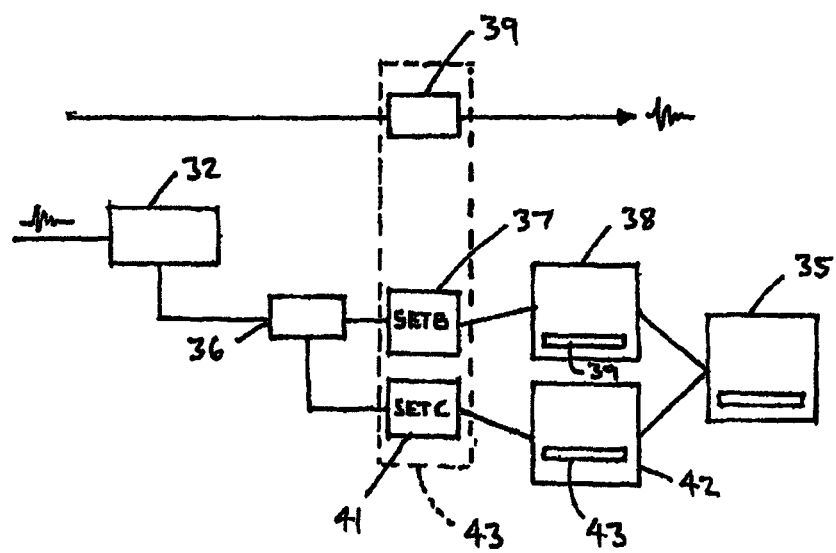

Referring now to FIG. 4b, the module 36 is used to produce another data file 41 that includes a data set C which is coded to produce an image 42, with a second subtitle overlay. The two data files 37, 41 may be combined as a single data file 43 that includes all of the files 37, 39 and 41 so that the audio of the film is in a first language, the subtitles 39 of the image 38 are in a second language and the subtitles 43 of the image 42 are in a third language.

This has significant advantages in countries where multiple languages are in use and a movie would otherwise need to be shown multiple times in different languages or with different language subtitles. This also has application for film festivals and advertising award ceremonies where there is often not enough time to screen a movie multiple times to cater for viewers that would prefer different languages.

Figure 5:
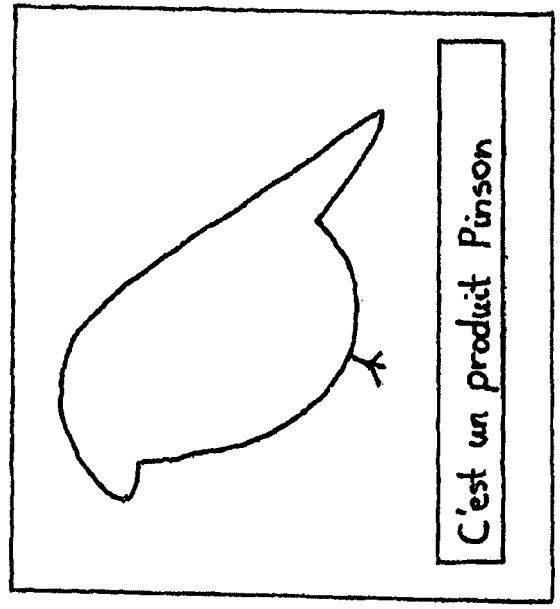
FIG. 5 is a diagrammatic representation of images with different content.
Figure 5:
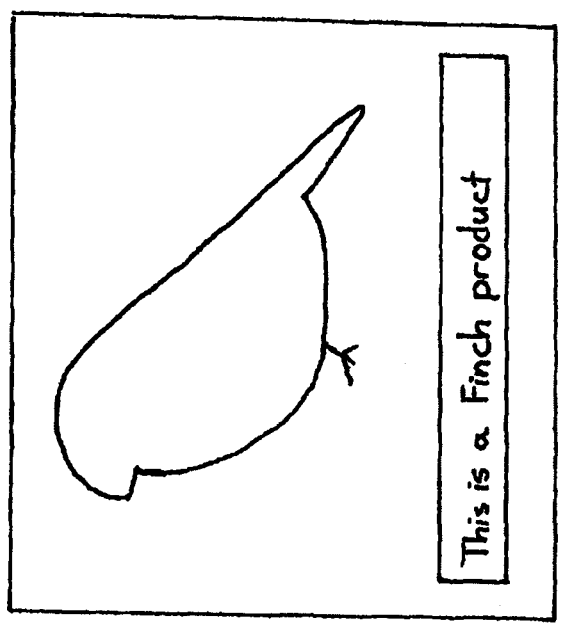

In FIG. 5, an example of two possible images 38, 43 are displayed. The images 38, 43 are derived from different data sets, set B and set C. One data set is for generating the image 38, which includes the subtitle "This is a Finch product". The other data set generates a similar image 43 but with different subtitle content conveying the same message in another language, in this case French, which reads "c'est un produit pinson".

During trials, it was found that a degree of bleeding or ghosting between images occurred. To minimize this effect, the different subtitles need to be synchronized to both be displayed for the same amount of time and to occupy the same amount of space on the screen. Depending on the contrast of the film, it is sometimes necessary to change the colour of the subtitle text, usually either white or yellow.

A custom graded backdrop has also been developed which is sometimes used to mask the text. This is done as another remediation measure, to minimize the bleed or ghosting which occurs when there is high contrast between the text and the image behind the text and not all the light is filtered out during the polarization, which becomes distracting to the viewer.

It has also been noted that bleeding and ghosting appears to be reduced when polarized glasses are used that have a thicker than normal lens, at about 0.4 mm, as opposed to the more usual 0.27 mm. The angle of the lenses has also been offset by 10 degrees and that also appears to reduce ghosting.

It should be appreciated that aside from correcting some minor ghosting issues, a person skilled in the art would readily be able to render a film with subtitles or process a video signal to be polarized or in a format suitable for viewing through active glasses using any suitable processing software and hardware so no further details of the specific technical requirements in that regard need to be provided. However, for digital film purposes the data file that includes the video image, and the rendered subtitle text is preferably in a data file format compatible with MXF (Material eXchange Format), in order to be compatible with Digital Cinema Package (DCP) software and hardware.

Specifically, the first set of subtitles (set B) is preferably hard coded to the film, which is then exported to a 3D file format. The film is then embedded again using only set C and again exported to a 3D file format. The files are then rendered using DCP (Digital Cinema Package) hardware and software and converted into an MXF file, which is DCP compatible.

By way of background, MXF is a "container" or "wrapper" format which supports a number of different streams of coded material, encoded with any of a variety of codecs, together with a metadata wrapper which describes the material contained within the MXF file.

As indicated, an MXF file format is compatible with Digital Cinema Package (DCP) which is a collection of digital files used to store and convey Digital Cinema (DC) audio, image, and data streams. General practice adopts a file structure that is organized into a number of usually multi-gigabyte size Material eXchange Format (MXF) files, which are separately used to store audio and video streams, and auxiliary index files in XML format.

The MXF files contain streams that are compressed, encoded, and encrypted, in order to reduce the huge amount of required storage and to protect from unauthorized use. The image part is JPEG 2000 compressed, whereas the audio part is linear PCM. The adopted (optional) encryption standard is AES 128 bit in CBC mode.

Digital encoding of subtitle text in a data file for the DCP and MXF format is itself industry standard, however, the establishment of a data file containing multiple language subtitles and indeed the use of different data sets with different image content for simultaneous display is new.

LIST OF PARTS

1. Viewing device
2. Filter
3. Filter
4. Lens
5. Lens
6. Glasses
7. Head
8. Viewer
9. Horizontal line
10. Method
11. Video stream
12. Video stream
13. Processor
14. First signal
15. Second signal
16. Step
17. Screen
18. Audio stream
19. Image
19'. Image
20. Game play system
21. First player
22. Second player
23. Processor
24. Display
25. Gaming console
26. Gaming console
27. First image
28. Second image
30. System
31. Video stream signal
32. Processor
33. Data file
34. First image
35. Display
36. Module
37. Data file
38. Second image
39. Subtitle
40. Audio stream
41. Data file
42. Image
43. Subtitle

The invention claimed is:

1. A system having an image production module adapted to:
   receive a first video stream and a second video stream;
   generate a first signal comprising images from the first video stream in a first polarity;
   a display module adapted to display the images on a screen simultaneously; and
   a visual aid to be worn by a viewer and allowing the viewer to view one of the displayed images and block the other image and to switch between the images, as required, using the same visual aid, the visual aid including a pair of polarized lenses, each lens being divided horizontally into top and bottom sections of perpendicular polarity with the top section of each lens being of the same polarity so that a displayed image of the first polarity can be viewed simultaneously through both eyes of the viewer through the respective top sections in one orientation and an image of the second polarity can be viewed through the bottom sections in each lens, in another orientation, wherein the different orientations are obtained by tilting the viewer's head up and down to look through the top sections of lenses or the bottom sections of lenses, wherein each lens has a thickness of about 0.4 mm, and wherein an angle of each lens is offset by about 10 degrees.

2. A visual aid including a pair of polarized lenses, each lens being divided into two sections of perpendicular polarity so that an image of one polarity can be viewed simultaneously through the glasses in one orientation and an image of another orientation can be viewed through the other sections in each lens, in another orientation wherein the sections are divided horizontally so that a viewer can view different images by tilting the glasses up and down to look through with the top set of lenses or the bottom set of lenses, wherein each lens has a thickness of about 0.4 mum, and wherein an angle of each lens is offset by about 10 degrees.

3. A viewing device including dual filters allowing selective viewing of both a first image of a first polarity and a second image of a perpendicular second polarity, respectively, wherein the filters are horizontally separated so that a viewer can switch between images by looking through either the top filters or the bottom filters, wherein the viewing device comprising at least one lens, wherein each of the at least one lens has a thickness of about 0.4 mm, and wherein an angle of each of the at least one lens is offset by about 10 degrees.

4. The viewing device of claim 3, wherein the dual filters are associated with each eye of a viewer.

5. The viewing device of claim 4, wherein the dual filters are each provided in the form of at least one lens in a glasses frame.

6. A method including:
   receiving a first video stream and a second video stream;
   processing first and second images of different scenes to have first and second polarity, respectively, for simultaneous display;
   displaying the images on a screen simultaneously; and
   viewing the images through a viewing device with dual filters, wherein the filters are horizontally separated so that a viewer can switch between images by looking through either the top filters or the bottom filters and wherein each of the dual filters allow transmission of one or the other of the displayed first and second images and wherein the viewer selects which of the filters to look through in order to switch between the images by tilting the viewing device up and down to look through with the top filters or the bottom filters, wherein the viewing device comprises at least one lens having an angle offset by about 10 degrees.

7. The method of claim 6, wherein the images are processed to sync with a common audio stream.

8. A game play system, including:
   a processor for producing a first video image of a first polarity and a second video image of a second polarity;
   a display for presenting the first and second images on a screen simultaneously; and
   a viewing device to allow a player to view one of the images and block the other image and to switch between the images, as required, using the same viewing device to switch between the video images, the viewing device including dual filters allowing selective viewing of both a first image of a first polarity and a second image of a perpendicular second polarity, respectively, wherein the filters are horizontally separated so that a viewer can switch between images by looking through either the top filters or the bottom filters by tilting the viewing device up and down to look through with the top filters or the bottom filters, wherein the viewing device comprises at least one lens having thickness of about 0.4 mm.

9. The system of claim 1, wherein the image production module is further configured to:
   synchronize the first signal and second signal with a common audio stream;
   add visual content to one or both of the first signal or the second signal; and
   combine the first signal, the second signal, the common audio stream, and the visual content into a single data file.

10. The game play system of claim 8, wherein the processor is further configured to:
    match a first audio feed to the first images and a different second audio feed to the second images.

* * * * *